US007973429B2

(12) United States Patent
Oda

(10) Patent No.: US 7,973,429 B2
(45) Date of Patent: Jul. 5, 2011

(54) APPARATUS WITH SPEAKER

(75) Inventor: Naoki Oda, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1113 days.

(21) Appl. No.: 11/693,278

(22) Filed: Mar. 29, 2007

(65) Prior Publication Data

US 2007/0230718 A1 Oct. 4, 2007

(30) Foreign Application Priority Data

Mar. 31, 2006 (JP) ................................ 2006-097251

(51) Int. Cl.
*H02J 1/00* (2006.01)

(52) U.S. Cl. ........................................................ 307/82

(58) Field of Classification Search ..................... 307/82
See application file for complete search history.

(56) References Cited

U.S. PATENT DOCUMENTS

| | | | | |
|---|---|---|---|---|
| 6,437,545 | B2 | 8/2002 | Sluijs | |
| 7,560,914 | B2 * | 7/2009 | O'Driscoll et al. | 323/267 |
| 7,847,532 | B2 * | 12/2010 | Potter et al. | 323/283 |
| 2005/0280312 | A1 * | 12/2005 | Litovsky et al. | 307/64 |

FOREIGN PATENT DOCUMENTS

| | | | |
|---|---|---|---|
| JP | 10-248238 | A | 9/1998 |
| JP | 2000-252914 | A | 9/2000 |
| WO | 02/03534 | A1 | 1/2002 |

* cited by examiner

*Primary Examiner* — Jared J Fureman
*Assistant Examiner* — Dru M Parries
(74) *Attorney, Agent, or Firm* — Banner & Witcoff, Ltd.

(57) ABSTRACT

An apparatus includes two DC/DC converters including two conversion circuits for converting a power supply voltage to first and second output voltages, respectively, two driving circuits for driving the respective conversion circuit based on first and second pulse wave modulated signals, and two pulse width modulation circuits for performing pulse width modulation on a thinned wave signal formed from a first wave signal and on a second wave signal to generate the pulse wave modulated signals, respectively. One DC/DC converter includes a thinning circuit for removing portions of a first wave signal to form the thinned wave signal. The apparatus includes a speaker for generating sound by inputting a signal based on the voltages.

10 Claims, 5 Drawing Sheets

APPARATUS WITH SPEAKER

CROSS REFERENCE TO RELATED APPLICATION

This application claims priority from Japanese Patent Application No. 2006-097251, filed on Mar. 31, 2006, the entire subject matter of which is incorporated herein by reference.

FIELD

Aspects of the present invention relate to an apparatus with a speaker, particularly, an apparatus with a speaker capable of generating a voltage in a wide range as well as restraining generation of beats.

BACKGROUND

Up to now, an apparatus with a speaker has been known, the speaker including a generating circuit for generating a sound signal and making a sound by amplifying a sound signal generated in the generating circuit by an amplifier. It has been also known that the apparatus with a speaker is mounted with a DC/DC converter for converting a DC voltage inputted from main power supply into two different kinds of DC voltage to output the two different kinds of converted DC voltage to the generating circuit as a power supply voltage.

On the other hand, as for the DC/DC converter, JP-A-2004-503197 discloses a multiple output DC/DC up-converter for independently controlling each output voltage by any of pulse width modulation (PWM) and pulse frequency modulation (PFM) for the purpose of highly efficient operation.

In the case of using the output voltage of the above-mentioned multiple output DC/DC up-converter disclosed in JP-A-2004-503197 as a power supply voltage for the above-mentioned generating circuit of the speaker, however, there is a problem as follows. That is to say, a difference in the frequency component between the two different types of output voltage overlaps with a sound signal generated in the generating circuit resulting in beats, which are outputted from the speaker as an unpleasant sound especially when the frequency difference is within an audible range, since each output voltage outputted from the multiple output DC/DC up-converter is independently controlled by any one of pulse width modulation (PWM) and pulse frequency modulation (PFM).

SUMMARY

Aspects of the invention provide an apparatus with a speaker capable of generating a voltage in a wide range while restraining generation of beats.

According to aspects of the invention, an apparatus includes a first DC/DC converter including a first conversion circuit for converting a power supply voltage from a main power supply to a first output voltage, a first driving circuit for driving the conversion circuit based on a first pulse wave modulated signal, a thinning circuit for removing portions of a first wave signal to form a thinned wave signal, and a first pulse width modulation circuit for performing pulse width modulation on the thinned wave signal to generate the first pulse wave modulated signal. Also the apparatus includes a second DC/DC converter including a second conversion circuit for converting a power supply voltage from a main power supply to a second output voltage, a second driving circuit for driving the conversion circuit based on a second pulse wave modulated signal, and a second pulse width modulation circuit for performing pulse width modulation on a second wave signal to generate the second pulse wave modulated signal. In addition, the apparatus can have a speaker driving circuit for generating a speaker driving signal based on the first output voltage and the second output voltage, and a speaker for generating a sound based on the speaker driving signal.

BRIEF DESCRIPTION OF THE DRAWINGS

Aspects of the invention will be described with reference to the accompanying drawings, wherein.

DETAILED DESCRIPTION

Figure 1:
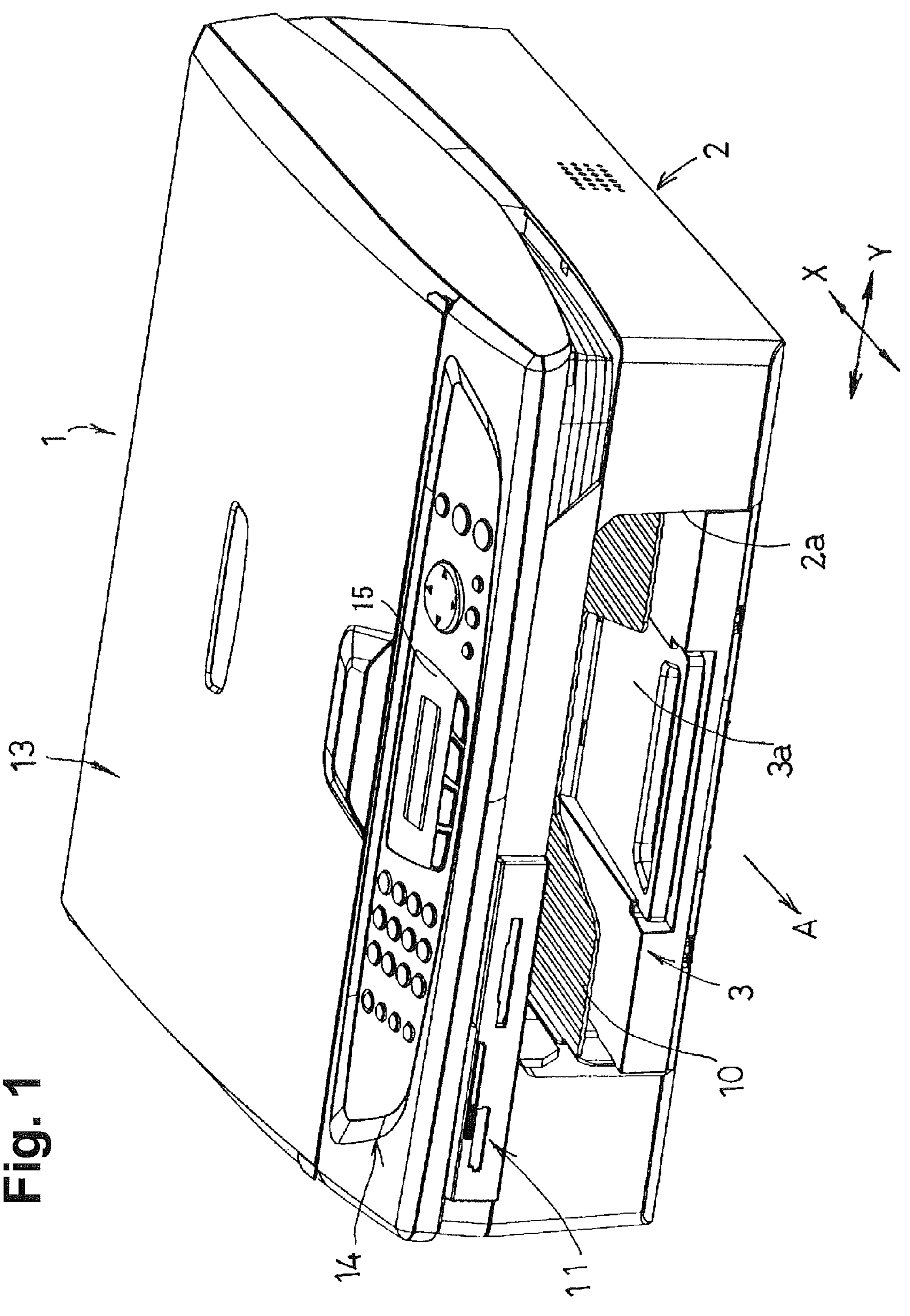
FIG. 1 is a perspective view of a multi-function peripheral device in accordance with aspects of the invention.

FIG. 1 is a front perspective view of a multi-function peripheral device 1 with a speaker according to aspects of the invention. The multi-function peripheral device 1 has a printing function, a copying function, a scanning function and a facsimile function.

An opening part 2*a* on a front side of a housing 2 in the multi-function peripheral device 1 is divided inside into upper and lower parts as shown in FIG. 1. Provided in the lower part of the opening part 2*a* is a feeding cassette 3 which is configured to be inserted into the opening part 2*a* for feeding a recording medium (recording paper P). Provided in the upper part of the opening part 2*a* is a discharging part (e.g. output tray) 10 from which a recorded sheet of the recording paper P is discharged. The recorded sheet of the recording paper P is discharged in a direction shown by an arrow A.

The feeding cassette 3 can hold sheets of the recording paper P in a stack as a recording medium (the recording paper). The recorded paper P may be, for example, A4 size, letter size or card size. A short side of the recording paper is placed in the feeding cassette in a main scanning direction (a Y axis direction, a direction crossing at right angles with an X axis direction (a sheet carrying direction)).

An image reader device is provided above the housing 2 for reading an original document when the copying and facsimile functions are invoked. The image reader device includes a cover 13 arranged to pivot with respect to one side end of the housing 2 through a pivot shaft part (not shown) so as to open and close in a vertical direction. In the example of FIG. 1, a rear end of the cover 13, which covers an upper surface of the image reader device, is mounted to the rear end of the image reader device so that the cover 13 can pivot about a pivot shaft in the vertical direction. The cover 13 can be opened upward so that an original can be put on a platen glass and an image on a surface of the original sheet can be read by a scanner for reading an original (a CIS (a contact image sensor), for example). The scanner is provided under the platen glass and configured to move in the main scanning direction (the Y shaft direction).

On the upper side of the housing 2 and in a front part of the cover 13, there is an operation panel 14 including various types of operation buttons, and a liquid crystal display device (referred to as an “LCD”, hereinafter) 15 for displaying an operation command or an operation state. An external memory port 11 for receiving an external memory is provided on the front surface of the housing 2 under the operation panel 14. The external memory is Compact Flash®, Smart Medium®, Memory Stick®, SD Card® or xD®, for example.

Figure 2:
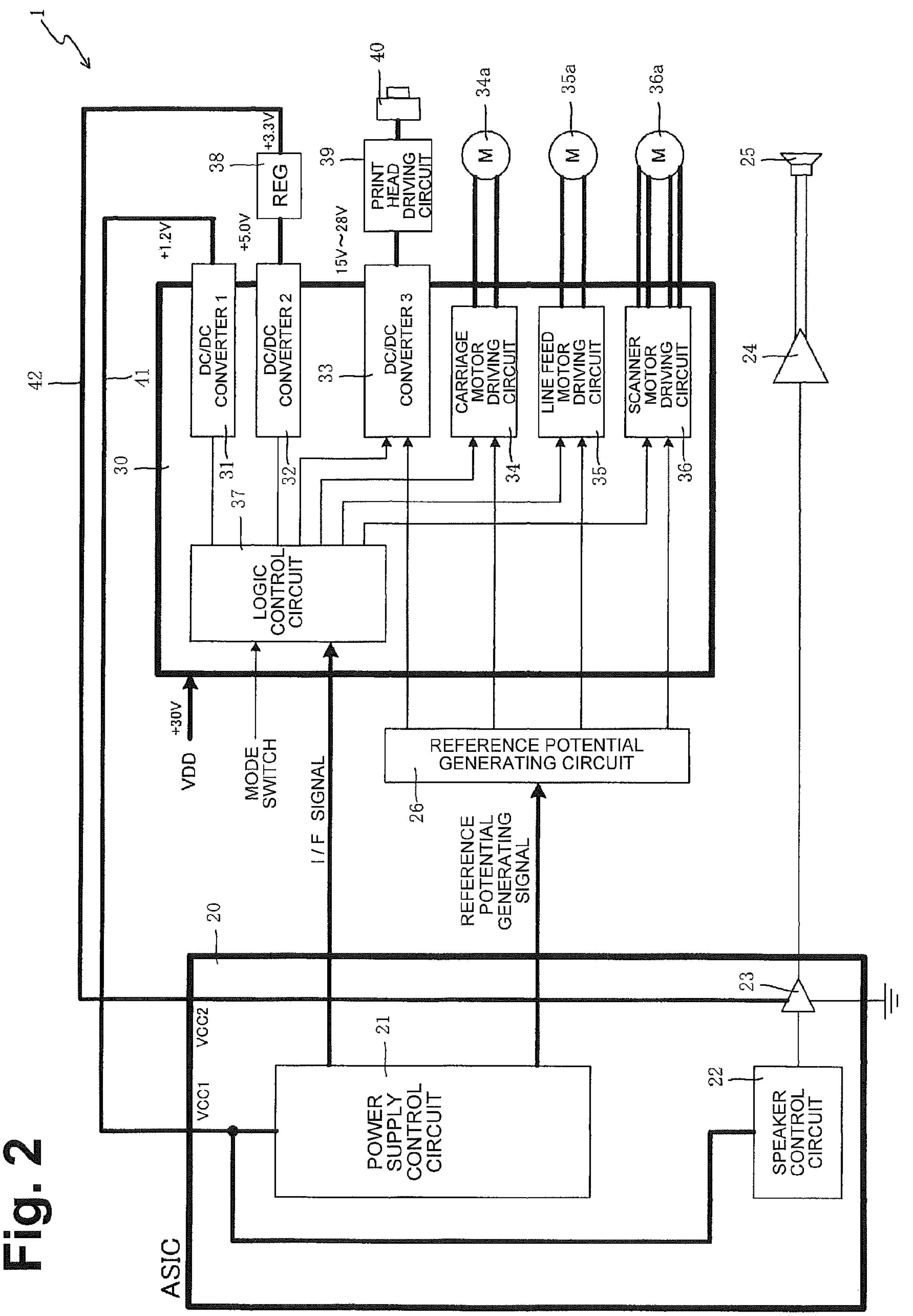
FIG. 2 is a block diagram showing an electrical structure of the multi-function peripheral device.

A main electrical structure of the multi-function peripheral device 1 will be described with reference to FIG. 2. FIG. 2 is a block diagram showing a main electrical structure of the multi-function peripheral device 1. The multi-function peripheral device 1 includes an ASIC 20 and a complex IC 21.

Realized on the ASIC 20 is a power supply control circuit 21 for controlling the power supplied to various types of motor and respective circuits, a speaker control circuit 22 and a buffer 23 connected to the speaker control circuit 22. The buffer 23 is connected to an amplifier 24 and a speaker 25 for outputting sound.

The power supply control circuit 21 is connected to a logic control circuit 37 and a reference potential generating circuit 26. The power supply control circuit 21 sends an I/F signal to the logic control circuit 37 and sends a reference potential generating signal to the reference potential generating circuit 26. The reference potential generating circuit 26 is connected to a third DC/DC converter 33, a carriage motor driving circuit 34, a line field motor driving circuit 35 and a scanner motor driving circuit 36. The reference potential generating circuit 26 generates potential, which is a standard potential generated in the respective circuits (33-36).

The speaker control circuit 22 generates a sound signal. The generated sound signal is outputted to the buffer 23 to be amplified. The sound signal is further amplified in the amp 24 and output from a speaker 25. In some aspects, an alarm sound due to the occurrence of an error or a line monitor sound may be output.

Realized on the complex IC 30 are a main part of a first DC/DC converter 31, a main part of a second DC/DC converter 32, a main part of the third DC/DC converter 33, the carriage motor driving circuit 34 for driving a carriage motor 34*a*, the line field motor driving circuit 35 for driving a line field motor 35*a*, the scanner motor driving circuit 36 for driving a scanner motor 36*a* and the logic control circuit 37 for controlling the respective circuits realized on the complex IC 20.

The first DC/DC converter 31 carries out pulse width modulation (PWM) and pulse frequency modulation (PFM) to generate a voltage of 1.2 V, which is lower than a power supply voltage VDD of 30 V. The generated voltage of 1.2 V is outputted to the power supply control circuit 21 and the speaker control circuit 22 as a power supply voltage through a wiring 41 and a power supply terminal VCC1 of the ASIC 20.

The second DC/DC converter 32 performs pulse width modulation (PWM) to generate a voltage of 5.0 V, which is lower than the power supply voltage VDD of 30 V. The generated voltage of 5.0 V is reduced from 5.0 V to 3.3 V by a regulator (Reg) 38. The reduced voltage of 3.3 V is outputted as a power supply voltage to the buffer 23 through a wiring 42 and a power supply terminal VCC2 of the ASIC 20. As such, two different voltages may be needed, 1.2 V for the speaker control circuit 22 and 3.3 V for the buffer 23, to output a sound signal from the speaker 25.

The third DC/DC converter 33 generates a variable voltage ranging from 15 V to 28V, which is lower than the power supply voltage VDD of 30 V. The generated variable voltage is outputted as a power supply voltage to a print head driving circuit 39 for driving a print head 40.

Figure 3:
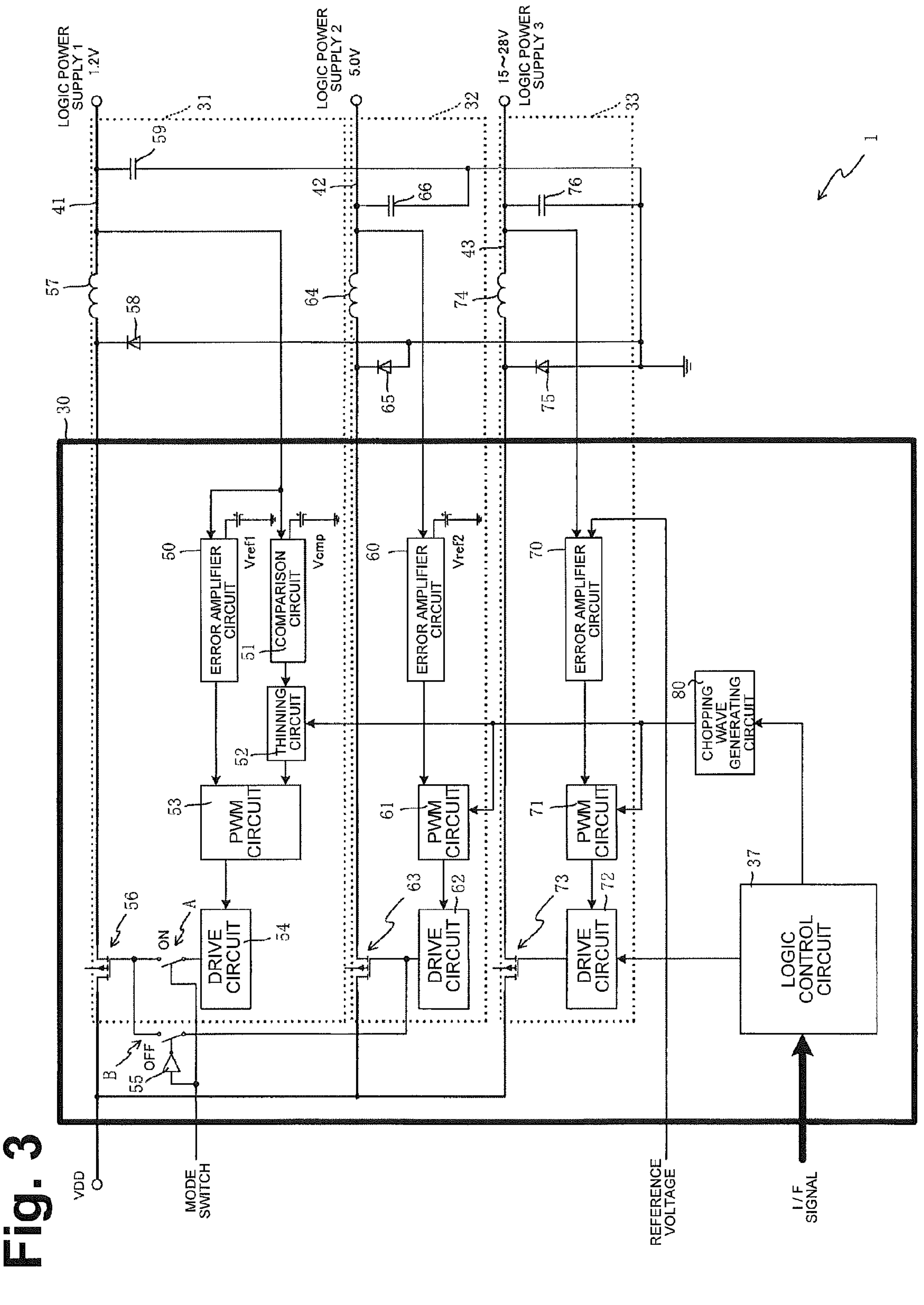
FIG. 3 is a block diagram showing an electric structure of a complex IC in detail.

Now, described in detail will be an electrical structure of the complex IC 30 with respect to FIG. 3. FIG. 3 is a block diagram showing an electrical structure of the complex IC 30 in detail.

The logic control circuit 37 outputs an ON/OFF signal of the variable voltage generated in the third DC/DC converter 33 and outputs a signal for setting switching frequencies of the respective DC/DC converters 31 to 33 to a chopping wave generating circuit 80.

The chopping wave generating circuit 80 is connected to each of a PWM circuit 53 via a circuit 52, a PWM circuit 61 and a PWM circuit 71. The chopping wave generating circuit 80 outputs a chopping wave for determining the switching frequency for each of the PWM circuit 53 via the thinning circuit 52, the PWM circuit 61 and the PWM circuit 71. That is to say, the respective DC/DC converters 31, 32 and 33 generate PWM signals as a switching signal with common chopping waves, being used as a reference wave, outputted from the chopping wave generating circuit 80 which may be a common oscillator. Accordingly, all of the respective PWM signals generated by the respective DC/DC converters 31, 32 and 33 for the purpose of outputting a voltage of 1.2 V, a voltage of 5.0 V and a variable voltage of 15 to 28 V are generated with the common chopping waves being used as the reference wave so that the respective PWM signals are generated as a signal having a synchronized cycle. Though the chopping wave is used as reference wave in one aspect of the invention, other wave types such as a sawtooth wave may be used instead of the chopping wave.

When a cycle of the output voltage of 1.2 V outputted from the first DC/DC converter 31 after pulse width modulation and pulse frequency modulation is not synchronized with a cycle of the output voltage of 3.3 V outputted from the second DC/DC converter 32 and reduced in voltage through the Reg 38 after pulse width modulation, a switching frequency component included in the output voltage of 1.2 V overlaps with a sound signal generated in the speaker control circuit 22 with the output voltage of 1.2 V being used as the power supply. The combination of the sound signal and the output voltage of 3.3 V in the buffer 23 results in overlap of a differential frequency component between the switching frequency component included in the output voltage of 1.2 V and the switching frequency component included in the output voltage of 3.3 V with the PWM signal generated as the sound signal. The differential frequency occurs as beats. When the differential frequency component falls within an audible frequency range, an unpleasant sound may be output from the speaker 25.

On the other hand, when a cycle of the switching frequency component of the output voltage of 1.2 V is synchronized with that of the switching frequency component of the output voltage of 3.3 V, the output of unpleasant sound can be prevented. The synchronizing of these frequency components allows occurrence of beats to be reduced since no differential frequency component exists even when both switching frequency components are combined in the buffer 23.

In the multi-function peripheral device 1 in FIG. 3, an inductor 57 is connected to a wiring 41 which is connected to the main power supply VDD, a diode 58 is connected to an input terminal of the inductor 57, and a capacitor 59 is connected to an output terminal of the inductor 57. The first DC/DC converter 31 includes an error amplifier circuit 50 and a comparison circuit 51, which are connected to the output terminal of the inductor 57, a thinning circuit 52 connected to the comparison circuit 51, a PWM circuit 53 connected to the thinning circuit 52 and the error amplifier circuit 50, a driving circuit 54 connected to the PWM circuit 53, a MOS-FET 56

(referred to as "MOS 56", hereinafter) connected to the driving circuit 54 and a gate, an inductor 57, a diode 58 and a capacitor 59. A source of the MOS 56 is connected to the main power supply VDD while a drain of the MOS 56 is connected to the input terminal of the inductor 57. The MOS 56, the inductor 57, the diode 58 and the capacitor 59 convert the power supply voltage to an output voltage of the DC/DC conversion circuit 31, which is then passed to the wiring 41.

The error amplifier circuit 50 amplifies an error by comparing an output voltage of the output terminal of inductor 57 and the reference potential Vref. The amplified signal is outputted to the PWM circuit 53. The comparison circuit 51 compares the output voltage of the output terminal of the inductor 57 and the reference potential Vcmp. The output of the comparison circuit 51 causes the thinning circuit 52 to execute a thinning process when the output voltage is greater than the reference potential Vcmp. The thinning circuit 52 thins a part of the reference waveform outputted from the chopping wave generating circuit 80 in accordance with a result of the comparison (the result being a thinning request signal) performed by the comparison circuit 51 and transmits the thinned reference waveform to the PWM circuit 53. The PWM circuit 53 generates a switching signal as a PWM signal for switching the MOS 56 based on the thinned reference waveform. The driving circuit 54 converts a voltage level of the PWM signal outputted from the PWM circuit 53 to switch the MOS 56. A switch A is connected between the driving circuit 54 and the gate of the MOS 56 to enable ON/OFF control between the driving circuit 54 and the gate of the MOS 56.

In accordance with the first DC/DC converter 31, the reference waveform of the chopping waves outputted from the chopping wave generating circuit 80 is thinned by the thinning circuit 52 when the comparison circuit 51 detects that the output voltage is greater than the reference potential Vcmp. The PWM circuit 53 generates the PWM signal as a switching signal based on the thinned chopping waves. This allows a PWM signal having a cycle synchronized with that of the PWM signal generated in the PWM control circuit 61 of the second DC/DC converter 32 to be generated.

In the multi-function peripheral device 1, an inductor 64 is connected to a wiring 42 connected to the main power supply VDD, a diode 65 is connected to an input terminal of the inductor 64, and a capacitor 66 is connected to an output terminal of the inductor 64. The second DC/DC converter 32 includes an error amplifier circuit 60 connected to the output terminal of the inductor 64, a PWM circuit 61 connected to the error amplifier circuit 60, a driving circuit 62 connected to the PWM circuit 61, a MOS-FET 63 (referred to as "MOS 63", hereinafter) connected to the driving circuit 62 and a gate, an inductor 64, a diode 65 and a capacitor 66. A source of the MOS 63 is connected to the main power supply VDD while a drain of the MOS 63 is connected to the input terminal of the inductor 64. The MOS 63, the inductor 64, the diode 65 and the capacitor 66 convert the power supply voltage to an output voltage of the DC/DC conversion circuit 32, which is then passed to the wiring 42.

In accordance with the second DC/DC converter 32, the error amplifier circuit 60 is used for comparing the reference voltage Vref2 and the output voltage at output terminal of the inductor 64. The output of the error amplifier circuit 60 is compared with the reference waveform of the chopping waves outputted from the chopping wave generating circuit 80 in the PWM circuit 61. This allows the PWM signal to be generated.

The third DC/DC converter 33 includes a inductor 74 connected to a wiring 43 connected to the main power supply VDD, a diode 75 connected to an input terminal of the inductor 74, a capacitor 76 connected to an output terminal of the inductor 74, an error amplifier circuit 70 connected to the output of the inductor 74, a PWM circuit 71 connected to the error amplifier circuit 70, a driving circuit 72 connected to the PWM circuit 71 and a MOS-FET 73 (referred to as "MOS 73", hereinafter) connected to the driving circuit 72 and a gate. A source of the MOS 73 is connected to the main power supply VDD while a drain of the MOS 73 is connected to the input terminal of the inductor 74. The MOS 73, the inductor 74, the diode 75 and the capacitor 76 convert the power supply voltage to an output voltage of the DC/DC conversion circuit 33, which is then passed to the wiring 43.

In accordance with the third DC/DC converter 33, the error amplifier circuit 70 is used for comparing the reference voltage outputted from the reference potential generating circuit 26 (refer to FIG. 1) and the output voltage at the output terminal of the inductor 74. The output of the error amplifier circuit 70 is compared with the reference waveform of the chopping waves outputted from the chopping wave generating circuit 80 by the PWM circuit 71. This allows the PWM signal to be generated.

As described above, in accordance with the multi-function peripheral device 1, the first DC/DC converter 31 and the second DC/DC converter 32 include in common the chopping wave generating circuit 80 for outputting the reference waveform necessary to generate the PWM signal. This allows a cycle of the PWM signal generated in the first DC/DC converter 31 to be synchronized with a cycle of the PWM signal generated in the second DC/DC converter 32 and a differential frequency component between the switching frequency component of the output voltage of the first DC/DC converter 31 and the switching frequency component of the output voltage of the second DC/DC converter 32 to be outside the audible range, so that generation of beats can be reduced.

Further, the main part of the first DC/DC converter 31 and the main part of the second DC/DC converter 32 are realized on the complex IC 30, which is a single integrated circuit chip. This allows influence in variation among components to be reduced, compared with a case that the first DC/DC converter 31 and the second DC/DC converter 32 are separately realized on different integrated circuits, so that a cycle of the PWM signal generated in each DC/DC converter can be easily synchronized.

Now, another method of using the first to third DC/DC converters 31 to 33 will be described according to aspects of the invention with reference to FIG. 4. The components common to those in the above-described aspects are marked with the same reference numerals and signs and description thereof is omitted. In the a above described aspects is a case that a voltage of 1.2 V is generated from the power supply voltage VDD of 30 V by pulse width modulation and pulse frequency modulation in the first DC/DC converter 31.

Figure 4:
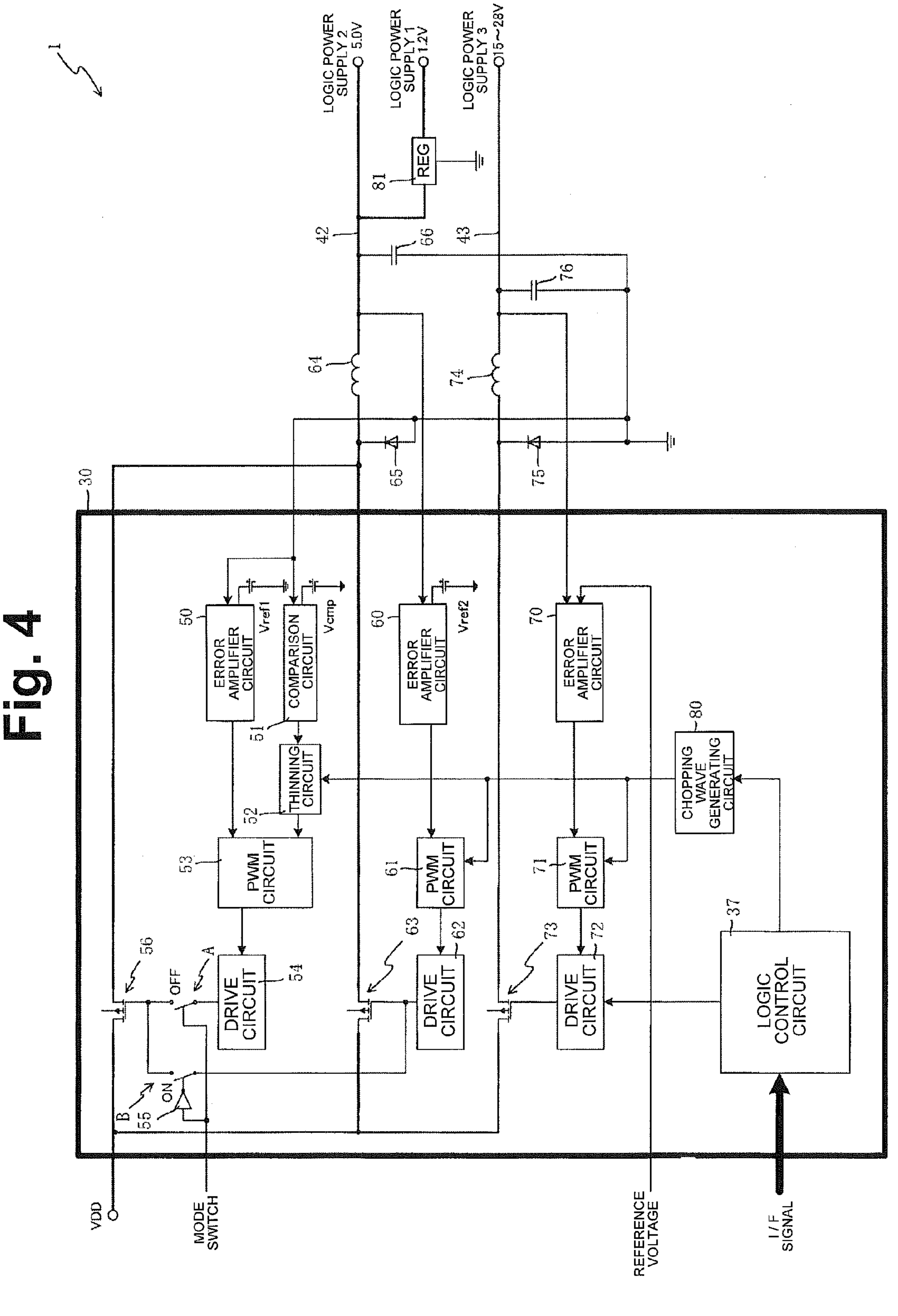
FIG. 4 is a block diagram showing additional illustrative aspects of the invention.

In the aspects of FIG. 4, connected in parallel are the first DC/DC converter 31 and the second DC/DC converter 32. The output at the output terminal of the inductor 64 is input to the comparison circuit 60 of the second DC/DC converter 32. The output at the output terminal of the inductor 64 is connected to the input terminal of the capacitor 66 and the output terminal of the capacitor 66 is connected to an input of the comparison circuits 50 and 51 of the first DC/DC converter 31. Also, the output at the output terminal of the inductor 74 is connected to the input terminal of the capacitor 76 and the output terminal of the capacitor 76 is connected to an input of the comparison circuits 50 and 51.

A switch A between the driving circuit 54 and the MOS 56 is switched OFF in accordance with an external mode switching signal and an inverter 55 while a switch B between the driving circuit 62 and the MOS 56 is switched ON in accordance with the inverter 55. A wiring is provided from an output terminal of the inductor 64 of the second DC/DC converter 32 through Reg 81. After an output voltage of 5.0 V is generated in the second DC/DC converter 32, the Reg 81 is used for reducing the voltage from 5.0 V to 1.2 V to output a voltage of 1.2 V. In accordance with this method, the first DC/DC converter 31 and the second DC/DC converter 32 are driven in parallel, so that the capacity of the power supply can be increased.

Figure 5:
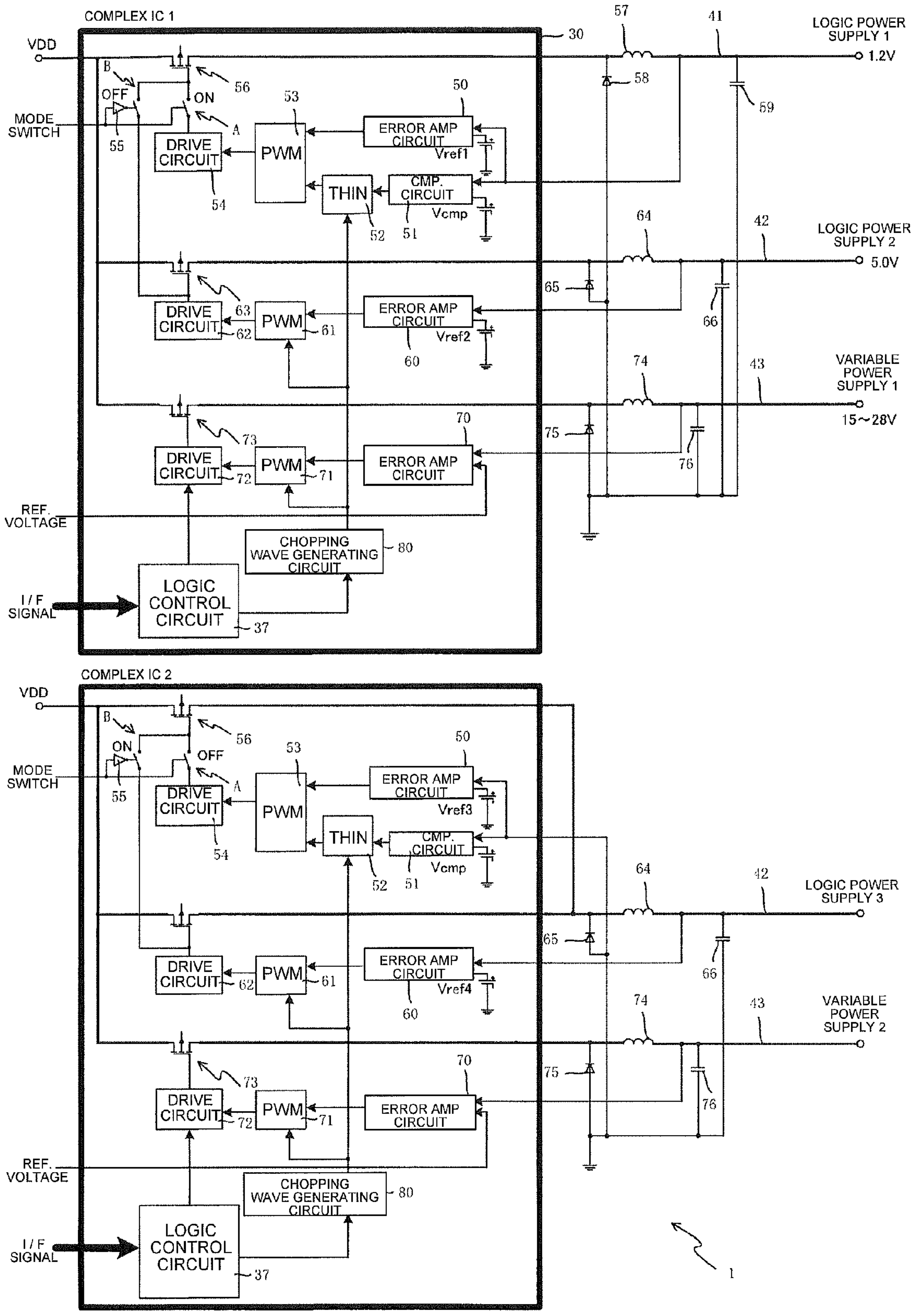
FIG. 5 is a block diagram showing still further additional illustrative aspects of the invention.

Further aspects of using the first to third DC/DC converters 31 to 33 will be described with reference to FIG. 5. The components common to those in the above-mentioned aspects are marked with the same reference numerals and signs and description thereof is omitted. The current aspects relate to a method of using the complex IC 30 illustrated in FIG. 3 and the complex IC 30 illustrated in FIG. 4 (the Reg 81, however, is excluded) in a parallel arrangement. In this case, five output voltages in total can be outputted. Also, it is possible to output voltages of an output voltage of 1.2 V, an output voltage of 5.0 V, a variable voltage of 15 to 28 V, an output voltage of 3.3 V and a variable voltage of 15 to 28 V in order from the output voltage in the upper part in FIG. 5. This allows the capacity of the power supply to be increased.

What is claimed is:

1. An apparatus comprising:

a first DC/DC converter including a first conversion circuit for converting a power supply voltage from a main power supply to a first output voltage, a first driving circuit for driving the first conversion circuit based on a first pulse wave modulated signal, a thinning circuit for removing portions of a first wave signal to form a thinned wave signal, and a first pulse width modulation circuit for performing pulse width modulation on the thinned wave signal to generate the first pulse wave modulated signal;

a second DC/DC converter including a second conversion circuit for converting a power supply voltage from a main power supply to a second output voltage, a second driving circuit for driving the second conversion circuit based on a second pulse wave modulated signal, and a second pulse width modulation circuit for performing pulse width modulation on a second wave signal to generate the second pulse wave modulated signal;

a speaker driving circuit for generating a speaker driving signal based on the first output voltage and the second output voltage; and a speaker for generating a sound based on the speaker driving signal.

2. The apparatus according to claim 1, wherein at least one of the first conversion circuit and the second conversion circuit includes an inductor.

3. The apparatus according to claim 1, wherein at least one of the first conversion circuit and the second conversion circuit includes a capacitor.

4. The apparatus according to claim 1, wherein at least one of the first conversion circuit and the second conversion circuit includes a MOS switch.

5. The apparatus according to claim 1, further comprising an oscillator for generating a reference pulse, the reference pulse being a reference for generating the first and second pulse wave modulated signals, wherein the thinning circuit thins a part of the reference pulse generated by the oscillator to thin the first wave signal.

6. The apparatus according to claim 5, wherein the oscillator generates a chopping wave.

7. The apparatus according to claim 1, wherein the first and second driving circuits and the first and second pulse width modulation circuits are realized on a single integrated circuit.

8. The apparatus according to claim 1, further comprising:

a recording head for recording an image on a recording medium; a head driving circuit for driving the recording head; and a third DC/DC converter including a third conversion circuit for converting a power supply voltage from a main power supply to a third output voltage, a third driving circuit for driving the third conversion circuit based on a third pulse wave modulated signal, and a third pulse width modulation circuit for performing pulse width modulation on a third wave signal to generate the third pulse wave modulated signal.

9. The apparatus according to claim 1, wherein the first DC/DC converter further includes a comparison circuit for comparing the first output voltage and a reference potential to generate a thinning request signal, wherein the thinning circuit thins the first wave signal when the thinning request signal is active.

10. The apparatus according to claim 1, wherein the first conversion circuit includes a first switch, the first pulse wave modulated signal is inputted to the first switch to activate the first switch, wherein the second conversion circuit includes a second switch, the second pulse wave modulated signal is inputted to the second switch to activate the second switch, wherein an output terminal of the first switch is connected to an output terminal of the second switch.

* * * * *